United States Patent [19]
Loucks et al.

[11] Patent Number: 5,823,043
[45] Date of Patent: Oct. 20, 1998

[54] TRANSDUCER RESPONSE COMPENSATOR

[75] Inventors: Richard B. Loucks, Sevecna Park; Larry G. Ferguson, Balto, both of Md.

[73] Assignee: The United States of America as represented by the Secretary of The Army, Washington, D.C.

[21] Appl. No.: 605,301

[22] Filed: Jan. 26, 1996

[51] Int. Cl.[6] .................................................. G01K 1/00
[52] U.S. Cl. .................................................. 73/1.01
[58] Field of Search .................. 73/1 R, 1.01; 374/2, 374/101, 102, 107, 169

[56] References Cited

U.S. PATENT DOCUMENTS 4,843,577  6/1989  Muramoto .
5,259,389  11/1993  Muramoto et al. ..................... 374/107

*Primary Examiner*—Robert Raevis
*Attorney, Agent, or Firm*—Paul S. Clohan; Frank J. Dynda

[57] ABSTRACT

A response compensation circuit receives the response signal of a first order transducer having a known response constant, splits the signal into a first and a second signal, time differentiates the first signal, then passes this signal through a first inverting amplifier with a gain equal to the transducer response constant. The second signal is passed through a second inverting amplifier with a gain equal to one and this output and that of the first inverting amplifier are passed through a summing amplifier to produce response compensated output signal.

2 Claims, 3 Drawing Sheets

TRANSDUCER RESPONSE COMPENSATOR

GOVERNMENTAL INTEREST

The invention described herein may be manufactured, used and licensed by or for the U.S. Government without payment to us of any royalty thereon.

TECHNICAL FIELD

The present invention relates to a method and apparatus for providing real-time response compensation for electronic transducers. In particular, the present invention creates a non-linear response characteristic inverse to that of an exponential response electronic transducer to compensate for the inability of the transducer to react to highly transient input phenomena.

DISCUSSION OF THE PRIOR ART

Transducers measure physical quantities by converting energy from one form to another, frequently from the parameter of interest, such as heat or motion, into a proportional electrical signal suitable for subsequent processing. An important characteristic of transducer performance is the speed with which the transducer can accurately react to a change in the measured parameter. This characteristic is represented by the rise time required for the transducer output signal to rise from a small percentage to a large percentage of steady state. For heat measuring transducers this rise time is exponential in form and the time required for the output to reach 63.2% of the total change when disturbed by a step function is called the characteristic time constant of the transducer. An ideal transducer would thus have a time constant of zero.

In situations where highly transient phenomena must be accurately measured, the ability of the transducer to respond quickly is critical. Unfortunately the response of most transducers is directly related to the inherent material physical properties, with response time increasing as increasing ruggedness is built into the transducer. Consequently, transducers built to withstand the harsh environment associated with fast phenomena like explosions have inadequately slow response times and, conversely, transducers sufficiently responsive to accurately record the phenomena are typically destroyed in the process.

When the demands of the measured environment exceed the response capability of practical instruments, response compensation must be performed on the signal obtained from ruggedized and thus survivable transducers which have inherently slow responses. Response compensation is usually performed as a post event data processing procedure. Data obtained from the measurement is recorded in analog format, or discretized into digital format. The response compensation is then processed on a digital computer and then further processed for plotting, storage, etc.

Post processing response compensation presents an additional burden to the processor since the digital computer is limited in machine accuracy and requires high resolution for discrete calculations. Additional software must be produced and processing time is increased, all at increasing costs and additional opportunity for error introduction.

OBJECTS AND SUMMARY OF THE INVENTION

It is therefore an object of the present invention to compensate transducer response to transient phenomena.

It is another object of the present invention to increase the frequency applicability range of existing transducers.

It is a further object of the present invention to provide a method to allow rugged robust transducers to be used to accurately measure highly transient phenomena.

It is yet another object of the present invention to eliminate the need to compensate for transducer response lag after output digitization.

It is a still further object of the present invention to provide a variably adjustable retrofittable real-time response compensator for existing transducers.

The aforesaid objects can be achieved individually and in combination and it is not intended that the invention be construed as requiring that two or more of said objects be combined.

In accordance with the present invention a non-linear response characteristic inverse to that of the transducer is produced to compensate the lagging response of the transducer. A first part of the transducer output signal is passed through a differentiating circuit, then through an inverting amplifier having a gain set equal to the transducer time constant and a second part of the transducer output signal is passed through an inverting amplifier having a gain equal to unity. The two resulting signals are recombined by a summary amplifier resulting in a fully compensated signal.

The above and still further objects, features and advantages of the present invention will become apparent upon considering the following detailed description of specific embodiments thereof, particularly when viewed in conjunction with the accompanying drawings wherein like reference numerals in the various figures are utilized to designate like components.

DESCRIPTION OF THE PREFERRED EMBODIMENTS

Figure 1:
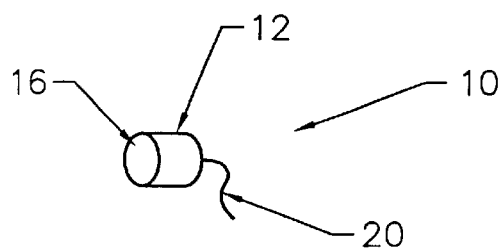
FIG. 1 is a perspective view of a Gardon gage used to measure thermal radiation.
Figure 2:
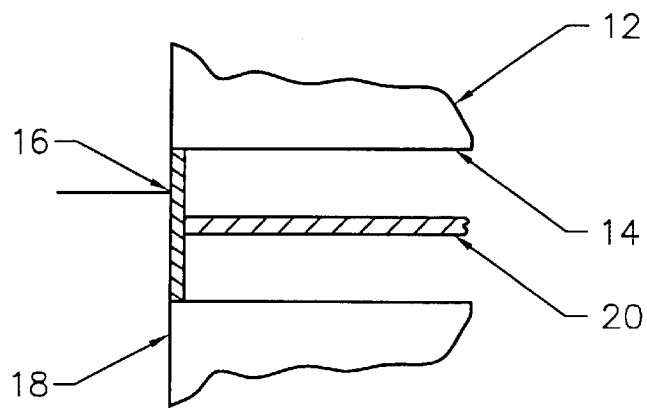
FIG. 2 is a partial cross-sectional view of the Gardon gage of FIG. 1.

Referring to FIGS. 1 and 2, a Gardon-type calorimeter 10 consists of a cylindrical copper body 12, approximately 2.54 cm long and 2.54 cm in diameter having a small axial throughhole 14.

A constantan diaphragm 16 is attached across throughhole 14 on the front surface 18 of calorimeter 10, and a copper lead 20 attached to the center of the diaphragm extends rearwardly to form a first thermocouple junction. The copper body 12 acts as a heat sink forming a second thermocouple junction. The difference in temperature at the two junctions produces a measurable voltage output.

The Gardon-type gauge is not an instantaneous or ideal measurement device and consequently has a response characteristic unique to the physical parameters of construction. This response characteristic is defined in specific terms as a response rate.

If the gauge were subjected to a step input, the result is an exponential rise of $(1-e^{t/C_t})$. The response specification is that 63.2% of the input would be registered in the output by a certain time. This time is the first time constant $C_t$. By knowing the time constant, one can "correct" the output from the Gardon gauge.

Given the following definitions:

$V_m$ is voltage produced from calorimeter;

$C_{TC}$ is proportionality constant;

$T_D$ is the diaphragm center temperature;

$T_B$ is the diaphragm edge temperature and is assumed constant with time;

$C_{VF}$ is a proportionality constant converting voltage to flux;

$C_{VT}$ is the product $C_{VF}C_{TC}$;

$F_m$ is the measured flux in cal/cm$^2$;

$F_i$ is the incident flux in cal/cm$^2$;

$C_p$ is the specific heat of the material; and m is the diaphragm mass.

The output voltage of the Gardon-type gauge can be written as:

$$V_m = C_{TC}(T_D - T_B)$$

and the measured flux can then be written as:

$$F_m = C_{VF}V_m = C_{VT}[T_D - T_B].$$

For a transient analysis, the change in internal energy of the sensing element can be written as:

$$\Delta E = C_p m(T_D - T_B).$$

The rate of change in the internal energy can be written as:

$$\frac{d\Delta E}{dt} = \frac{d(C_p m T_D)}{dt}$$

The rate of change of the internal energy of the diaphragm is assumed to equal the net exchange of energy between the radiant flux into the surface and the energy conducted away at the edge, and can be written as:

$$\frac{d\Delta E}{dt} = F_i - F_m = F_i - C_{VT}(T_D - T_B)$$

This sets up a differential equation:

$$\frac{dT_D}{dt} = \frac{F_i + C_{VT}T_B}{C_p m} - \frac{C_{VT}T_D}{C_p m} \quad (1)$$

The solution of this differential equation can be found in several ways. The method of using an integration factor is used. In general for any differential equation in the form:

$$\frac{dy}{dx} + yP(x) = G(x)$$

the solution can be expressed as:

$$y = \frac{1}{\mu(x)} \left[ \int_o^x \mu(s)G(s)ds + C_{onst} \right] \quad (2)$$

where $$\mu(x) = \exp\left[ \int_o^x P(s)ds \right] \quad (3)$$

and $C_{onst}$ represents a constant of integration. By substituting the terms of equation (1) into equation (2) and equation (3), and simplifying, the result is a solution for $T_D$ in the form of $F_m$ and $F_i$. This solution is:

$$F_i = F_m + \frac{C_p m}{C_{VT}} \left( \frac{dF_m}{dt} \right) \quad (4)$$

As it turns out, the constant $C_p m/C_{VT}$ is equivalent to time constant $C_t$ in the response rate equation, $(1-e^{t/C}_t)$, and the form of equation (4) becomes:

$$S_a = Sm + C \frac{d(Sm)}{dt} \quad (5)$$

is the signal produced by an ideal transducer; Sm is the measured signal; and C is the transducer constant. Equation (5) is used in mathematical post-processing of transducer output to correct or compensate for the lag induced distortion caused by the known consistent response lag, and to translate the actual gauge output into that of an ideal transducer.

Figure 3:
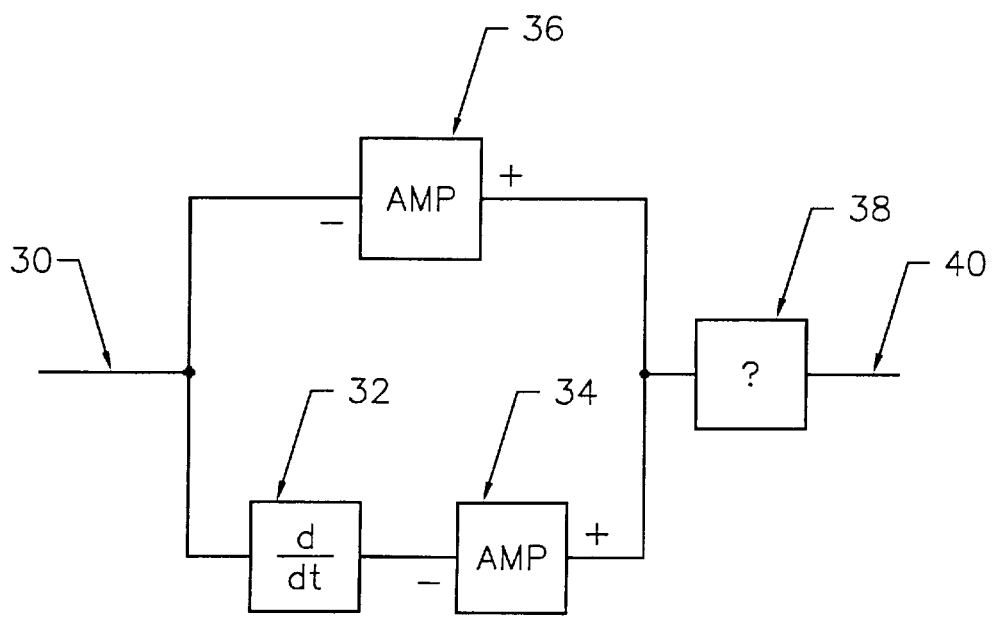
FIG. 3 is a functional block diagram of a compensating circuit according to the present invention.

In the present invention an electronic circuit obeying equation (5) receives the transducer output and performs the response compensation. The transducer output 30 is split, as shown in functional block diagram, FIG. 3. A first part of the transducer output signal is provided as an input signal to a time differentiating circuit 32. The output signal from differentiator circuit 32 is provided as input signal for a first inverting amplifier circuit 34 having a gain set to correspond to $C_t$ in equation (4), the gauge time constant. The second part of the transducer output signal 30 is provided as an input signal to a second inverting amplifier circuit 36 having a gain set to unity. The output signals of the two inverting amplifiers are combined by summing amplifier 38 to produce the compensated signal 40.

Figure 4:
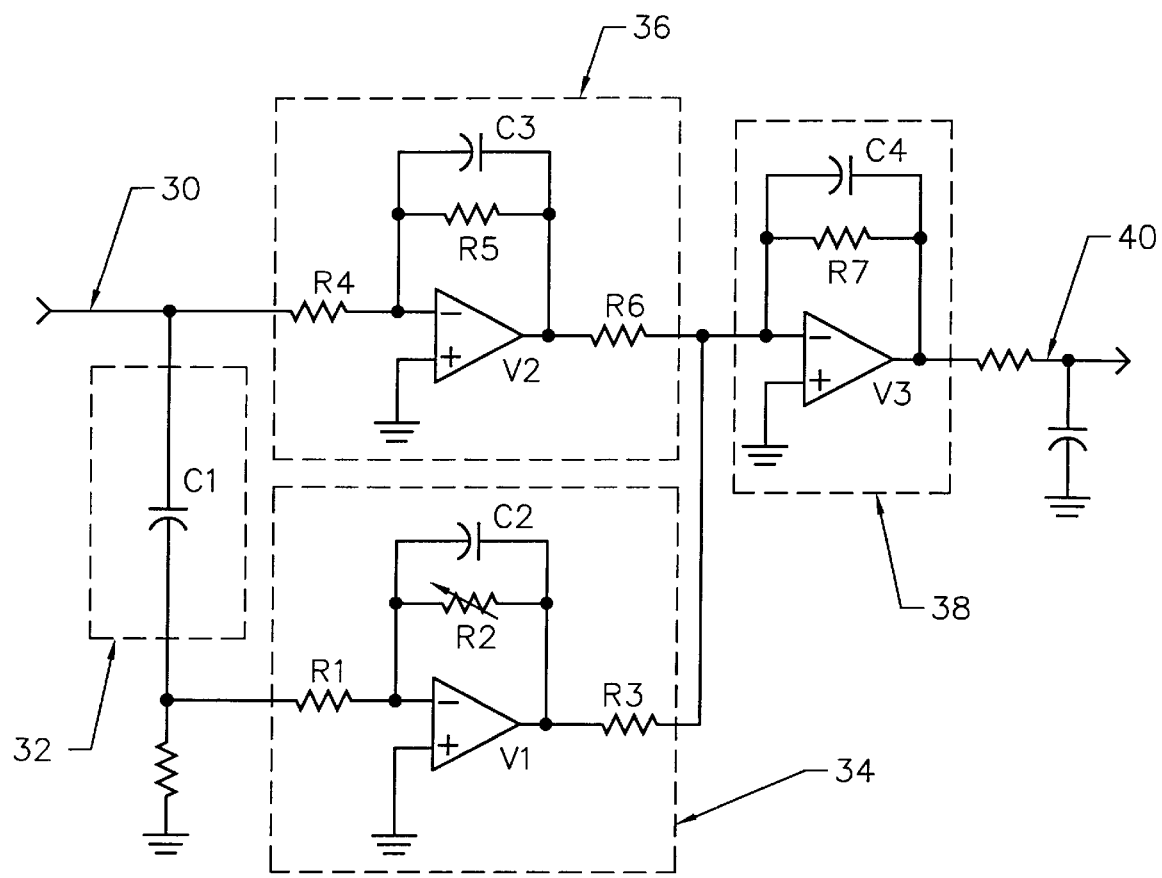
FIG. 4 is an electrical circuit diagram of a transducer response compensator of the present invention.

A particular embodiment, shown in FIG. 4, is designed to provide compensation for the Gardon-type transducer illustrated in FIGS. 1 and 2. The transducer is a Medtherm Corporation calorimeter with a factory rated response time constant of 50 ms ranging from 0.1 to 25 cal/cm$^2$-sec. The material properties remain constant.

The transducer output signal 30 is divided and coupled through capacitor C1 having a value of 22 pf, for time differentiation, then to inverting amplifier circuit 34 comprising a first resistor R1 in series with grounded inverting amplifier V1 having a negative feedback loop consisting of a variable resistor R2 and a capacitor C2 connected in parallel. A second resistor R3 has as its input signal the amplifier output signal. Values of R1, R2, C2 and R3 are 10KΩ, 300KΩ, 56 pf and 10kΩ, respectively, are selected to produce a tunable circuit gain equal to the transducer time constant, 50 ms. A reference current level is established between capacitor C1 and amplifier circuit 34 via a grounded 1MΩ resistor.

Divided transducer output signal 30 is also coupled to a second inverting amplifier circuit 36 comprising a first resistor R4 connected to a grounded inverting amplifier V2 having a negative feedback loop consisting of a resistor R5 and capacitor C3 in parallel. A second resistor R6 takes as input the output of amplifier V1. Values of R4, R5, C3 and R6 are 100KΩ, 1MΩ, 56 pf and 10KΩ respectively, are selected to produce a circuit gain of one.

The output signals of circuits 34 and 36 are coupled and provided as input to a summing amplifier circuit 38 comprising grounded amplifier V3 having a feedback loop consisting of a resistor R7 and a capacitor C4 in parallel having values of 10KΩ and 22 pf respectively. The output of circuit 38, after conditioning by a low pass filter consisting of a 1MΩ resistor and 10 pf capacitor, is the transducer signal compensated for the response lag.

An example of the performance of the circuit of FIG. 4 is shown by the results of an experiment wherein an arc lamp with an exterior focusing lens was used to irradiate the calorimeter with about 5 cal/cm$^2$-sec of constant flux. A blade pendulum with a 2.54 cm square window was inserted between the calorimeter and the arc lamp. When set in motion, the pendulum blocked all thermal radiation into the calorimeter until the window swung into position and allowed the calorimeter to be exposed to the arc lamp. The time period of exposure was 420 ms. An infrared detector operating in the linear response range was used as the reference signal, with a response rate on the order of 9 nanoseconds. The voltage output signal was split, with one end connected to an amplifier, then to a digital oscilloscope and the other output connected to the compensator circuit, which in turn was connected to the oscilloscope. The uncompensated signal was amplified to ensure that a steady state exposure gave an equal output level for both outputs. At full exposure, both calorimeter signals and the infrared detector with gain registered 10.1 V.

Figure 5:
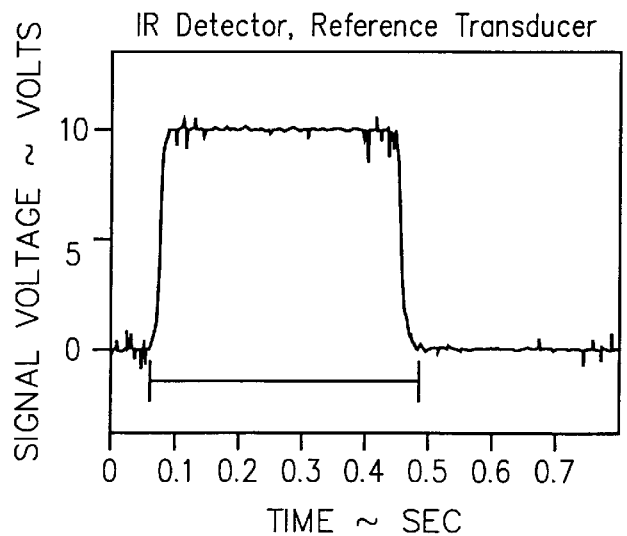
FIG. 5 is a plot of an output signal voltage with respect to time generated by a transient reference irradiation focused on an infrared detector operating within the linear response range.
Figure 6:
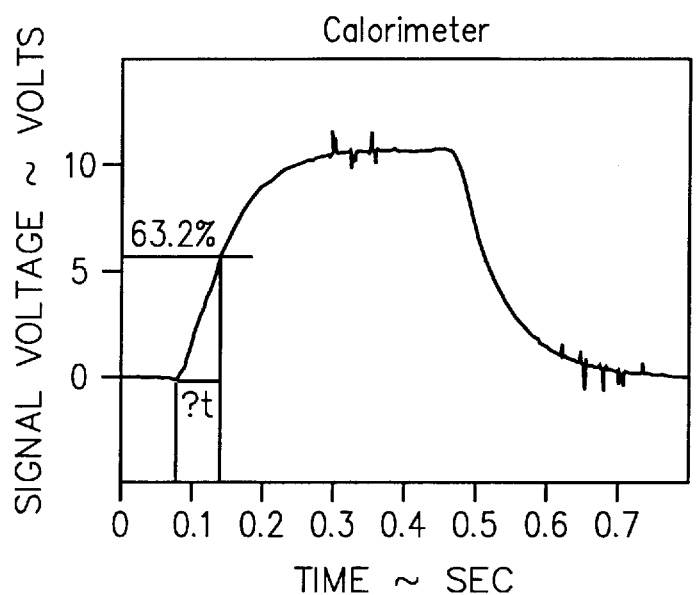
FIG. 6 is a plot of the signal voltage with respect to time generated by an uncompensated calorimeter exposed to the transient reference irradiation.
Figure 7:
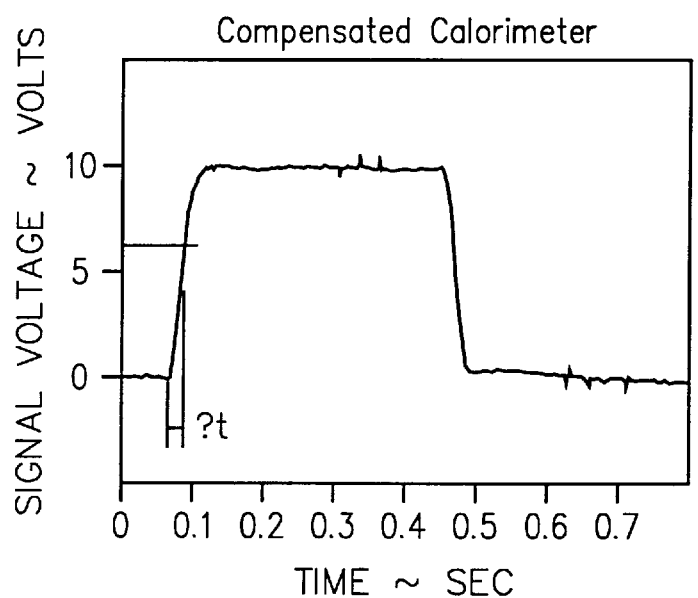
FIG. 7 is a plot of the signal voltage with respect to time generated by a calorimeter response compensated according to the present invention exposed to the same transient reference irradiation.

The infrared detector output, shown in FIG. 5, shows a rise of 33 ms, corresponding to the time needed to fully expose the detector. The output of the uncompensated calorimeter, shown in FIG. 6 is that of an exponential rise and decay. The rise time of the uncompensated signal was about 60 ms. The rise time of the compensated signal, shown in FIG. 7 is less than 2 ms. This is the time required to fully expose the 1 mm wide calorimeter sensor diaphragm and the resultant compensated signal closely follows the original input.

While a specific embodiment of the present invention has been shown and described, it will be obvious to those skilled in the art that changes and other modifications may be made without departing from the invention. Values can be selected for the circuit components to provide compensation for any first order electronic transducer producing an output having a generally known generally constant response. The circuit can be added as an in-line but separate processing member in the transducer signal flowpath or can be built into the transducer and factory calibrated at manufacture. Resistance parts can also be added to allow selectable adjustment of response compensation.

It is, therefore, intended that the claims herein are to include all such obvious changes and modifications as fall within the true spirit and scope of this invention.

What is claimed:

1. A response-compensated electronic transducer apparatus comprising:

a first order electronic transducer producing an output signal having a response characterized by a known response constant; and a circuit for adjusting the transducer output signal to approach the response of an ideal transducer having a response constant of zero.

2. The response-compensated electronic transducer apparatus of claim 1 wherein said adjusting circuit obeys a compensation equation of the form $$S_a = Sm + C \frac{d(Sm)}{dt}$$

where $S_a$ is a signal produced by an ideal transducer $S_m$ is by said first order electronic transducer output signal; and C is the time constant of said transducer.

* * * * *